(12) United States Patent
Yu et al.

(10) Patent No.: US 12,311,478 B2
(45) Date of Patent: May 27, 2025

(54) ANTI-SKID AND WEAR-RESISTANT AUTOMATIC POSITIONING TOOL FOR WELDING PRODUCTION LINE BASED ON DIGITAL TWINNING

(71) Applicant: Jilin University, Jilin (CN)

(72) Inventors: Zhenglei Yu, Jilin (CN); Delong Gao, Jilin (CN); Yiwen Zhang, Jilin (CN); Long Ma, Jilin (CN); Lidong Gu, Jilin (CN); Lei Dong, Jilin (CN); Shouxin Ruan, Jilin (CN); Xin Li, Jilin (CN); Zezhou Xu, Jilin (CN); Yunting Guo, Jilin (CN); Linsen Song, Jilin (CN); Jing Jiao, Jilin (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 18/883,350

(22) Filed: Sep. 12, 2024

(65) Prior Publication Data

US 2025/0121462 A1   Apr. 17, 2025

(30) Foreign Application Priority Data

Oct. 12, 2023   (CN) .......................... 202311315669.5

(51) Int. Cl.
   *B23K 37/04*   (2006.01)
(52) U.S. Cl.
   CPC ................. *B23K 37/0443* (2013.01)
(58) Field of Classification Search
   CPC ..................... B23K 37/0443; B62D 65/026
   See application file for complete search history.

(56) References Cited

U.S. PATENT DOCUMENTS

| | | | | |
|---|---|---|---|---|
| 6,463,644 B1 * | 10/2002 | Pasque | ................. | B62D 65/026 269/21 |
| 11,643,285 B1 * | 5/2023 | Wei | ....................... | B65G 47/90 414/751.1 |
| 2006/0182603 A1 | 8/2006 | Hawes | | |
| 2013/0106042 A1* | 5/2013 | Gao | ..................... | B62D 65/026 269/289 R |
| 2013/0113149 A1* | 5/2013 | Yeum | ................. | B23K 37/0443 269/60 |

(Continued)

FOREIGN PATENT DOCUMENTS

| | | | | |
|---|---|---|---|---|
| CN | 108311845 A | * | 7/2018 | ............. B23K 37/04 |
| CN | 108705244 A | * | 10/2018 | ......... B23K 37/0443 |

(Continued)

*Primary Examiner* — Keith Walker
*Assistant Examiner* — Carlos J Gamino

(57) ABSTRACT

Disclosed is an anti-skip and wear-resistant automatic positioning tool for welding production line based on digital twinning. Insertion holes are uniformly disposed on a base plate, and the insertion holes serve to be inserted with support columns. Flat plates are fixedly connected to telescopic air cylinders. Telescopic pulling columns are hinged to upper ends of the support columns. Tabletop cleaning components are mounted on the base plate. In the present disclosure, welding slag adhered to surfaces of clamping plates can be effectively removed, preventing issues when clamping the next welding vehicle body. This avoids minor scratches or dents on a surface of the vehicle body caused by pressure from particles of the welding slag, ensuring that the welding process is not affected by the presence of welding slag.

9 Claims, 9 Drawing Sheets

(56) References Cited

U.S. PATENT DOCUMENTS

2014/0366352 A1* 12/2014 Jang .................... B62D 65/026
                                                                       29/281.1

FOREIGN PATENT DOCUMENTS

| CN | 109304573 A | * | 2/2019 | ......... B23K 37/0443 |
|----|----|----|----|----|
| CN | 112705818 A | * | 4/2021 | ......... B23K 37/0443 |
| CN | 112926770 A | | 6/2021 | |
| CN | 115156822 A | | 10/2022 | |
| CN | 115846003 A | | 3/2023 | |
| CN | 218946686 U | | 5/2023 | |
| CN | 116493855 A | * | 7/2023 | ......... B23K 37/0443 |
| GB | 1537505 A | | 12/1978 | |
| WO | 2021191754 A1 | | 9/2021 | |

* cited by examiner

US 12,311,478 B2

ANTI-SKID AND WEAR-RESISTANT AUTOMATIC POSITIONING TOOL FOR WELDING PRODUCTION LINE BASED ON DIGITAL TWINNING

CROSS-REFERENCE TO RELATED APPLICATION

This application claims priority of Chinese Patent Application No. 202311315669.5, filed on Oct. 12, 2023, the entire contents of which are incorporated herein by reference.

TECHNICAL FIELD

The present disclosure relates to the technical field of welding clamping tools, and specifically to an anti-skid and wear-resistant automatic positioning tool for welding production line based on digital twinning.

BACKGROUND

As important transportation tools, vehicles serve as a symbol of the level of scientific and technological development. The automotive industry plays a particularly significant role in the advancement of manufacturing industry globally. In the vehicle welding process, digital twinning technology is employed to continuously collect and intelligently analyze operational data. This allows for the prediction of the optimal timing for maintenance tasks and provides a reference for maintenance cycles. The digital twin can offer insights into failure points and the probability of failures. The vehicle body welding production line refers to the collective assembly stations for the entire vehicle body, consisting of a main assembly line and numerous sub-assembly lines. Each main or sub-assembly line is made up of multiple welding stations, which include various positioning and clamping fixtures, automatic welding devices, and inspection devices, as well as power, gas, and water supply devices.

In the welding process of existing vehicle bodies, it is essential to have sufficient welding materials to ensure welding quality. Otherwise, issues such as incomplete welding and voids may occur, leading to the generation of excess welding materials, which form into welding slag. The splattered welding slag can easily land on the fixtures of the welding tools. If the welding slag is not promptly disposed of, particles adhering to the fixture's surface can be pressed onto the new welded vehicle body during clamping. The vehicle bodies are typically made of aluminum alloy, which has a relatively low hardness, and the pressure applied by the fixture remains constant, this can result in the adhered particles being pressed into the vehicle body, causing small dents and defects. In severe cases, debris can be embedded into the vehicle body, leading to a damaged vehicle body that is below standard.

Additionally, conventional vehicle body welding tools require manual disassembly and reconfiguration when different vehicle models are switched due to variations in sizes and designs of vehicle body. This process often involves adjusting and installing the tools using bolts and nuts. Given the large number of welding tools, significant amounts of time are consumed, which may adversely affect the progress of welding the vehicle body.

In response to this, the present disclosure provides an anti-skid and wear-resistant automatic positioning tool for welding production line based on digital twinning.

SUMMARY

Aiming at the deficiencies of the prior art, the present disclosure provides an anti-skid and wear-resistant automatic positioning tool for welding production line based on digital twinning, solving the problem raised in the above background.

To achieve the above objective, the present disclosure provides the following technical solutions. An anti-skid and wear-resistant automatic positioning tool for welding production line based on digital twinning includes a base plate. A plurality of insertion holes are uniformly disposed on the base plate, and the insertion holes serve to be inserted with support columns; outer walls of the support columns are fixedly connected to flat plates, and the flat plates are fixedly connected to telescopic air cylinders; telescopic pulling columns are hinged to upper ends of the support columns, and upper ends of the telescopic air cylinders are rotatably connected to the telescopic pulling columns; ends, away from the telescopic air cylinders, of the telescopic pulling columns are fixedly connected to clamping plates; and a placement plate is mounted on the base plate, and portable and detachable chip removal components and tabletop cleaning components are mounted on the base plate.

Each of the portable and detachable chip removal components includes a hollow conical sleeve, a limit spring, limit insertion blocks, guide columns, auxiliary springs, insertion grooves, a first rotating shaft, a second rotating shaft, a sweeping brush plate, a belt, a long rod, an L-shaped rod, a magnetic sliding sleeve rod, a magnetic block I, and a magnetic block II; a portion, below the flat plate, of the support column is slidably sleeved with the hollow conical sleeve, and an outer wall of the support column is sleeved with the limit spring; grooves are disposed on a circumferential surface of a portion, inserted into the insertion hole, of the support column; the limit insertion blocks are slidably connected inside the grooves, close to a lower portion, of the support column, and upper portions of the limit insertion blocks are fixedly connected to the guide columns; a plurality of auxiliary springs are uniformly and fixedly connected to the outer wall of the support column, and one end of each of the auxiliary springs is fixedly connected to outer walls of the guide columns; the insertion grooves are disposed at positions, corresponding to the grooves, of an inner wall of the insertion hole; the outer wall of the support column is rotatably connected to the first rotating shaft and the second rotating shaft, and an outer wall of the first rotating shaft is connected to that of the second rotating shaft via the belt in a transmission manner; one end of the first rotating shaft is fixedly connected to the sweeping brush plate; one face of the belt is fixedly connected to the long rod; one end, close to the telescopic pulling column, of the telescopic air cylinder is fixedly connected to the L-shaped rod, and one face, close to the long rod, of the L-shaped rod is slidably connected to the magnetic sliding sleeve rod; and an outer wall, close to the magnetic sliding sleeve rod, of the support column is fixedly connected to the magnetic block I and the magnetic block II.

Preferably, an upper end of the limit spring is fixedly connected to the outer wall of the support column, and a lower end of the limit spring is fixedly connected to the hollow conical sleeve.

Preferably, the magnetic sliding sleeve rod is sleeved on an exterior of the long rod, the magnetic sliding sleeve rod has a magnetic pole opposite to that of the magnetic block I, and the magnetic sliding sleeve rod has the same magnetic pole as the magnetic block II.

Preferably, each of the portable and detachable chip removal components further includes a spring-loaded telescopic short rod, the spring-loaded telescopic short rod being fixedly connected to an upper portion of the flat plate, and an upper end of the spring-loaded telescopic short rod being fixedly connected to the long rod.

Preferably, four groups of the limit insertion block, the guide column, the auxiliary spring and the insertion groove are arranged, with the limit insertion block being inserted in the insertion groove.

Preferably, two groups of the tabletop cleaning components are arranged, each group of tabletop cleaning component including air outlet pipes, bottom plates, and extension rods; the base plate is symmetrically and fixedly connected to the air outlet pipes, and the air outlet pipes are internally arranged with one-way air outlet valves; and a lower portion of the base plate is slidably connected to the bottom plates, and end portions of the bottom plates are fixedly connected to the extension rods.

Preferably, the tabletop cleaning component further includes a piston pumping column, and an inner cavity of one end, close to the extension rod, of the air outlet pipe is slidably connected to the piston pumping column in a penetrating manner.

Preferably, the tabletop cleaning component further includes a one-way air inlet valve, and a reset spring; the one-way air inlet valve is arranged at an exterior of the air outlet pipe, the reset spring is sleeved on an outer wall of the piston pumping rod, and one end of the extension rod is fixedly connected to the piston pumping rod.

Preferably, one end of the reset spring is fixedly connected to an outer wall of the air outlet pipe, and the other end of the reset spring is fixedly connected to an outer wall of the piston pumping column.

The anti-skid and wear-resistant automatic positioning tool for welding production line based on digital twinning provided in the present disclosure has the following beneficial effect.

The belt is driven to move by the long rod, and the first rotating shaft and the second rotating shaft are driven to rotate, so that the sweeping brush plate rotatably cleans surfaces of the clamping plates after clamping, and welding slag adhered to the surfaces of the clamping plates can be effectively removed, preventing issues when clamping the next welding vehicle body. This avoids minor scratches or dents on a body surface caused by pressure from slag particles, ensuring that the welding process is not affected by the presence of welding slag, reducing defective vehicle bodies, and improving the quality of vehicle body welding.

The reset and rebound of the auxiliary springs push the guide columns and the limit insertion blocks away from the support columns again, and the limit insertion blocks are inserted into the corresponding insertion grooves in round holes, so that the mounted support columns and clamping plates can be adjusted, which not only can be applied to different vehicle models for clamping, but also facilitate the user to quickly adjust the clamping tool in switching vehicle models, eliminating the cumbersome steps of adjusting with bolts and nuts traditionally required, reducing labor intensity and saving waiting time for welding different vehicle models.

When the air suction is performed, the one-way air intake valve is opened, allowing air to enter the air outlet pipe. Subsequently, the extension rod can be loosened, and the reset spring resets and rebounds to slide the piston pumping column close to the air outlet pipe. At this point, the one-way air intake valve is closed, while the one-way air outlet valve inside the air outlet pipe is opened, expelling the air that is just pumped in through the air holes on the air outlet pipe. The two air outlet pipes are arranged opposite to blow air towards the center of the base plate simultaneously, facilitating the removal of residual welding slag from the base plate to the groove in the center. Additionally, when the bottom plates move away in opposite directions, their upper portions will no longer block the insertion holes and the lower portion of the base plate, making it easier to expel welding slag from the insertion holes. This helps maintain the cleanliness of both the base plate and the working environment, while reducing the temperature of the welding table and minimizing the impact of residual welding slag on the components of vehicle body.

Figure 1:
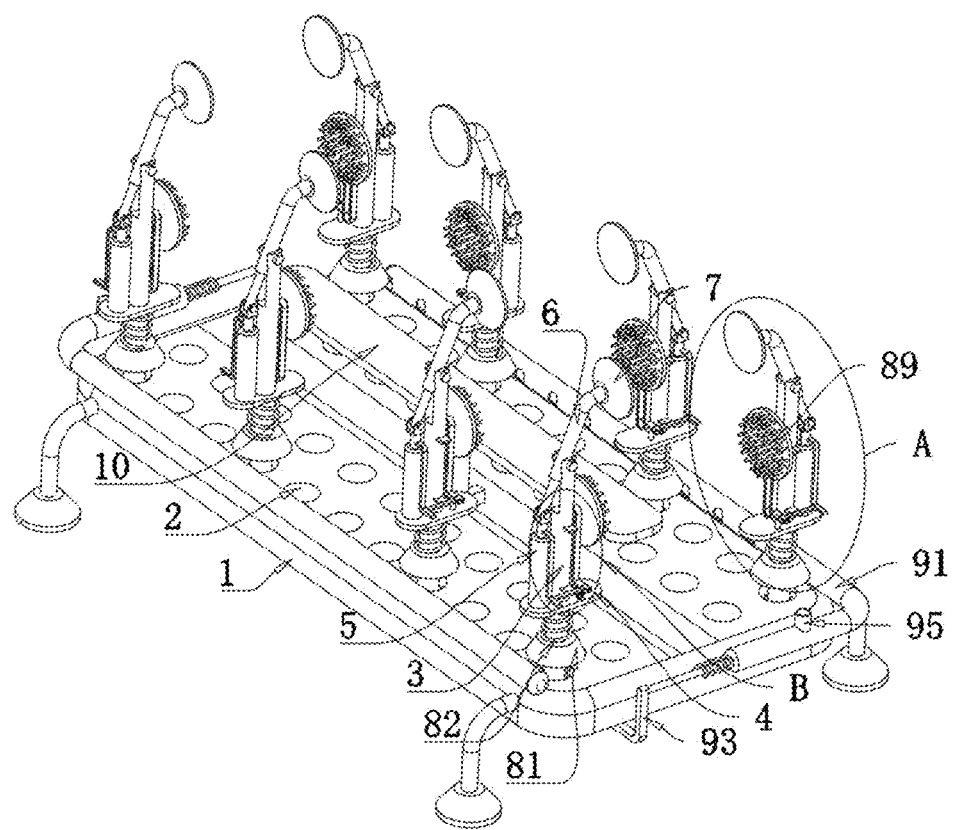
FIG. 1 is a perspective view according to the present disclosure.

Reference numerals and denotations thereof: 1—base plate; 2—insertion hole; 3—support column; 4—flat plate; 5—telescopic air cylinder; 6—telescopic pulling column; 7—clamping plate; 81—hollow conical sleeve; 82—limit spring; 83—limit insertion block; 84—guide column; 85—auxiliary spring; 86—insertion groove; 87—first rotating shaft; 88—second rotating shaft; 89—sweeping brush plate; 810—belt; 811—long rod; 812—L-shaped rod; 813—magnetic sliding sleeve rod; 814—magnetic block I; 815—magnetic block II; 816—spring-loaded telescopic short rod; and

91—air outlet pipe; 92—bottom plate; 93—extension rod; 94—piston pumping column; 95—one-way air inlet valve; 96—reset spring; and 10—placement plate.

DETAILED DESCRIPTION

The technical solutions of the examples in the present disclosure will be described clearly and completely by reference to the accompanying drawings of the examples in the present disclosure below. Obviously, the examples described are only some, rather than all examples of the present disclosure. Based on the examples of the present disclosure, all the other examples obtained by those ordinary skilled in the art without creative efforts belong to the protection scope of the present disclosure.

Example One of the Present Disclosure

Figure 2:
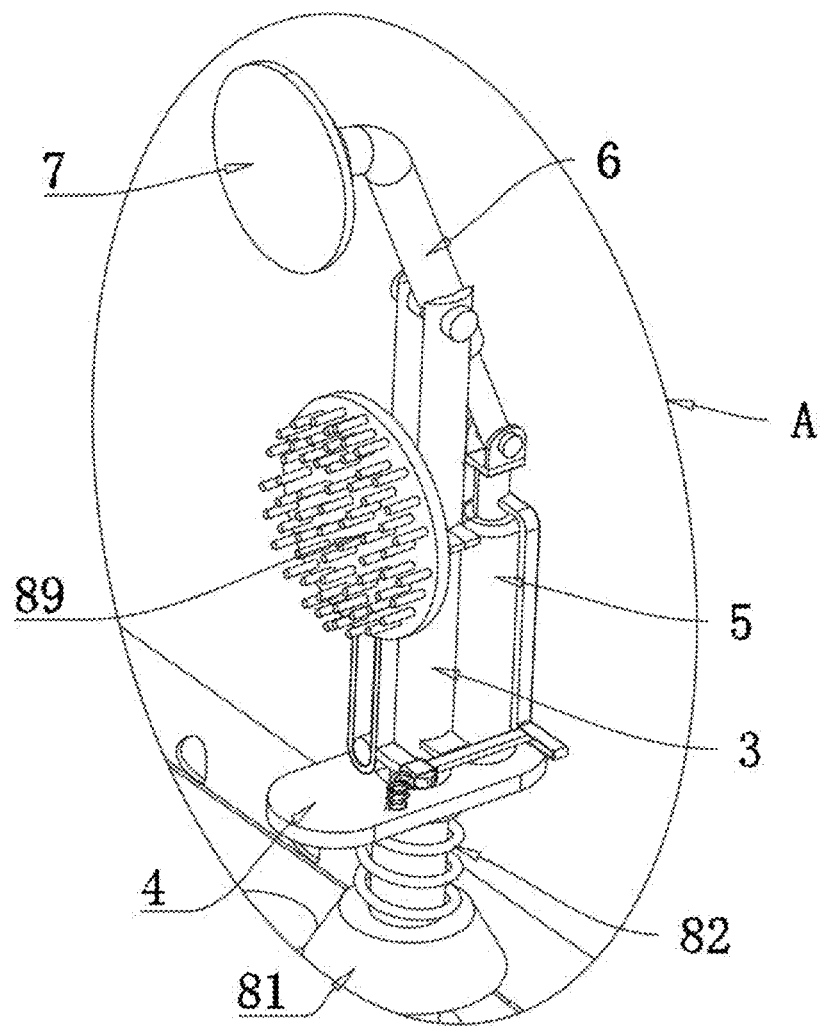
FIG. 2 is an enlargement view of portion A in FIG. 1 according to the present disclosure.
Figure 5:
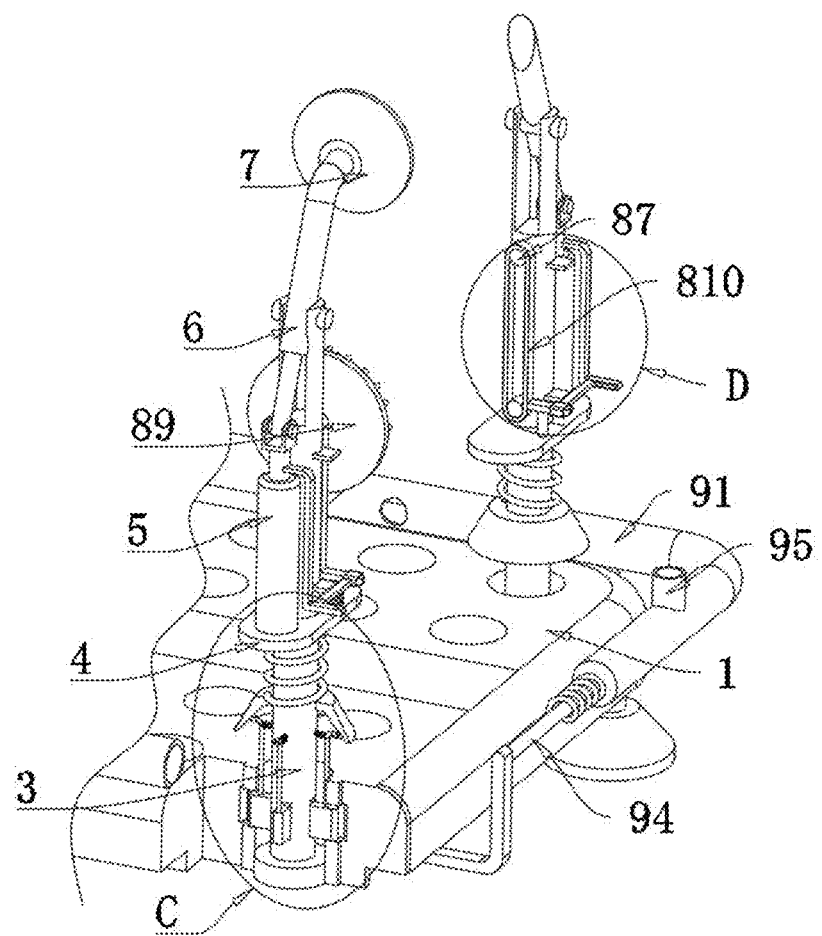
FIG. 5 is a schematic diagram I of a partially sectional structure according to the present disclosure.
Figure 6:
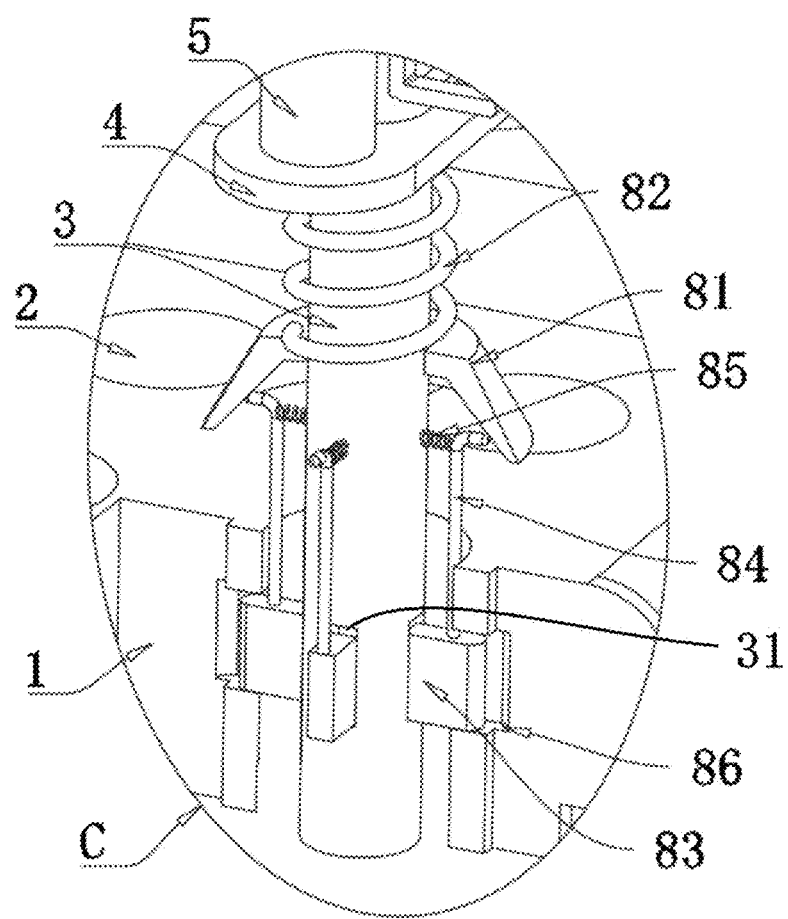
FIG. 6 is an enlargement view of portion C in FIG. 5 according to the present disclosure.

Referring to FIGS. 1, 2 and 5, an anti-skid and wear-resistant automatic positioning tool for welding production line based on digital twinning includes a base plate 1. A plurality of insertion holes 2 are uniformly disposed on the base plate 1, and the insertion holes 2 serve to be inserted with support columns 3. Outer walls of the support columns 3 are fixedly connected to flat plates 4, and the flat plates 4 are fixedly connected to telescopic air cylinders 5. Telescopic pulling columns 6 are hinged to upper ends of the support columns 3, and upper ends of the telescopic air cylinders 5 are rotatably connected to the telescopic pulling columns 6. Ends, away from the telescopic air cylinders 5, of the telescopic pulling columns 6 are fixedly connected to clamping plates 7. A placement plate 10 is mounted on the base plate 1, and a plurality of groups of portable and detachable chip removal components and two groups of tabletop cleaning components are mounted on the base plate 1.

Referring to FIGS. 1-7, each of the portable and detachable chip removal components includes a hollow conical sleeve 81, a limit spring 82, limit insertion blocks 83, guide columns 84, auxiliary springs 85, insertion grooves 86, a first rotating shaft 87, a second rotating shaft 88, a sweeping brush plate 89, a belt 810, a long rod 811, an L-shaped rod 812, a magnetic sliding sleeve rod 813, a magnetic block I 814, and a magnetic block II 815. An outer wall of the support column 3 is slidably sleeved with the hollow conical sleeve 81, and the outer wall of the support column 3 is sleeved with the limit spring 82. Grooves 31 are disposed on a circumferential surface of a portion, inserted into the insertion hole 2, of the support column 3, and the limit insertion blocks 83 are uniformly and slidably connected inside the grooves 31, and the limit insertion blocks 83 can slide along a radical direction of the support column 3. Upper portions of the limit insertion blocks 83 are fixedly connected to the guide columns 84. A plurality of auxiliary springs 85 are uniformly and fixedly connected to the outer wall of the support column 3, and one end of each of the auxiliary springs 85 is fixedly connected to outer walls of the guide columns 84. The insertion grooves 86 are disposed at positions, corresponding to the grooves 31, of an inner wall of the insertion hole 2, and the insertion groove 86 is located inside the insertion hole 2. The outer wall of the support column 3 is rotatably connected to the first rotating shaft 87 and the second rotating shaft 88, and an outer wall of the first rotating shaft 87 is connected to that of the second rotating shaft 88 via the belt 810 in a transmission manner. One end of the first rotating shaft 87 is fixedly connected to the sweeping brush plate 89. One face of the belt 810 is fixedly connected to the long rod 811. One end, close to the telescopic pulling column 6, of the telescopic air cylinder 5 is fixedly connected to the L-shaped rod 812, and one face, close to the long rod 811, of the L-shaped rod 812 is slidably connected to the magnetic sliding sleeve rod 813. An outer wall, close to the magnetic sliding sleeve rod 813, of the support column 3 is fixedly connected to the magnetic block I 814 and the magnetic block II 815. The hollow conical sleeve 81 has an inner surface in the shape of a hollow cone, and the guide column 84 abuts against a wall of an inner cavity of the hollow conical sleeve 81. In a normal state, the hollow conical sleeve 81 fits closely to the upper portion of the base plate 1.

Figure 3:
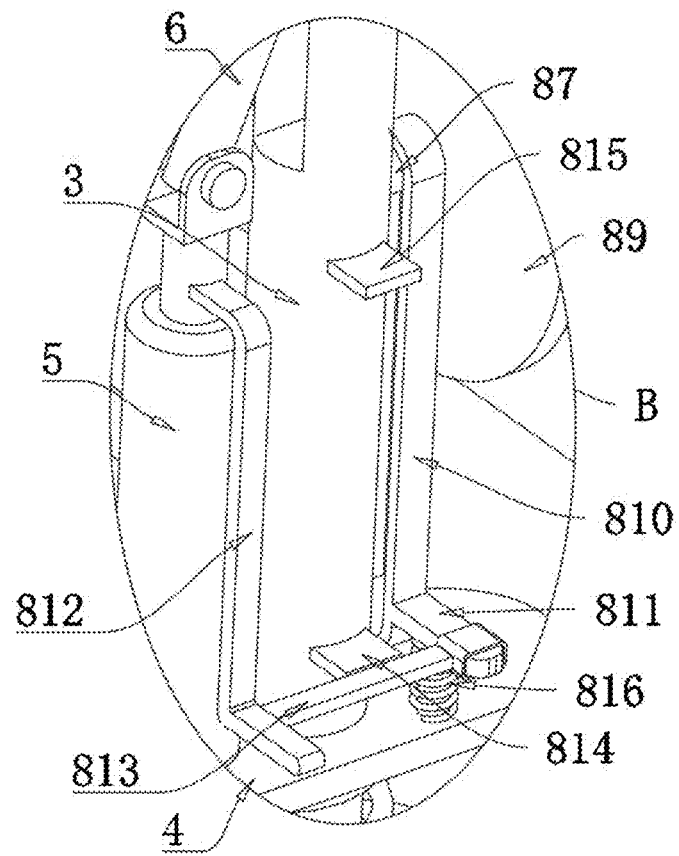
FIG. 3 is an enlargement view of portion B in FIG. 1 according to the present disclosure.
Figure 7:
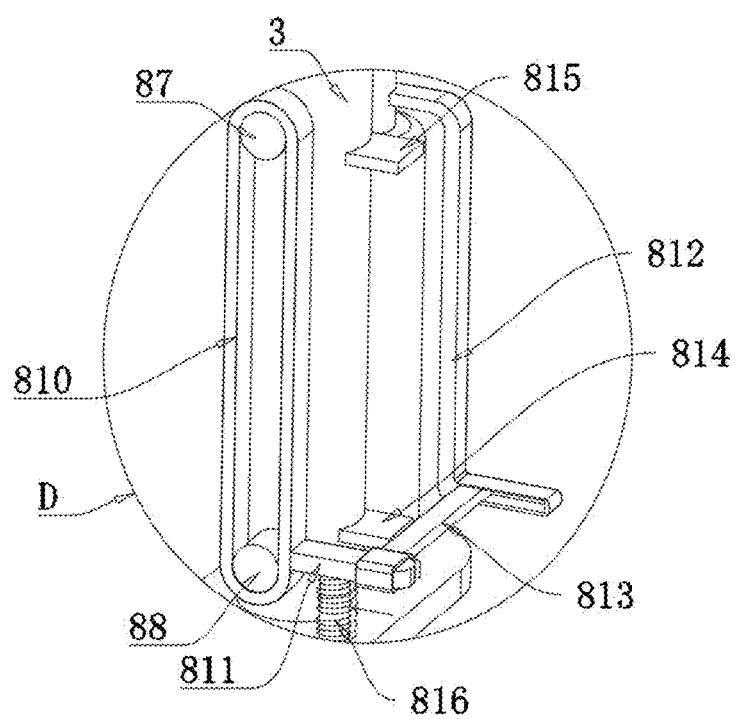
FIG. 7 is an enlargement view of portion D in FIG. 5 according to the present disclosure.
Figure 8:
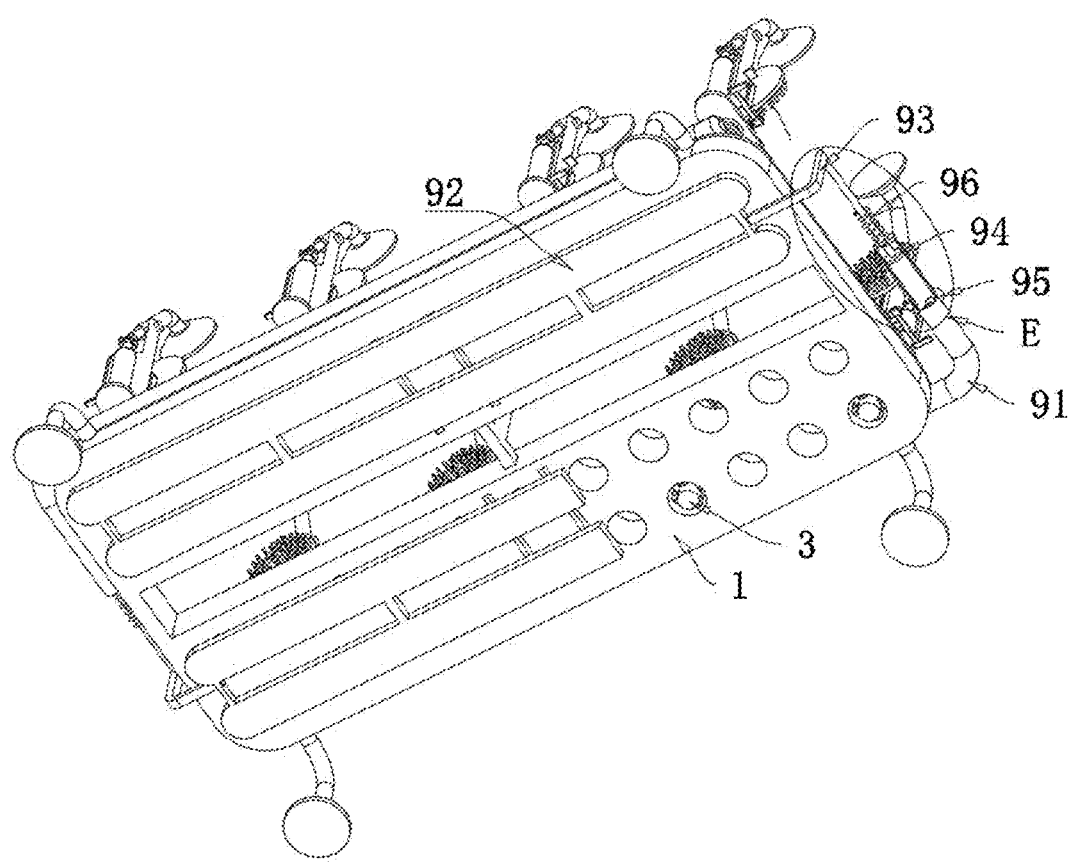
FIG. 8 is a schematic diagram II of a partially sectional structure according to the present disclosure.
Figure 9:
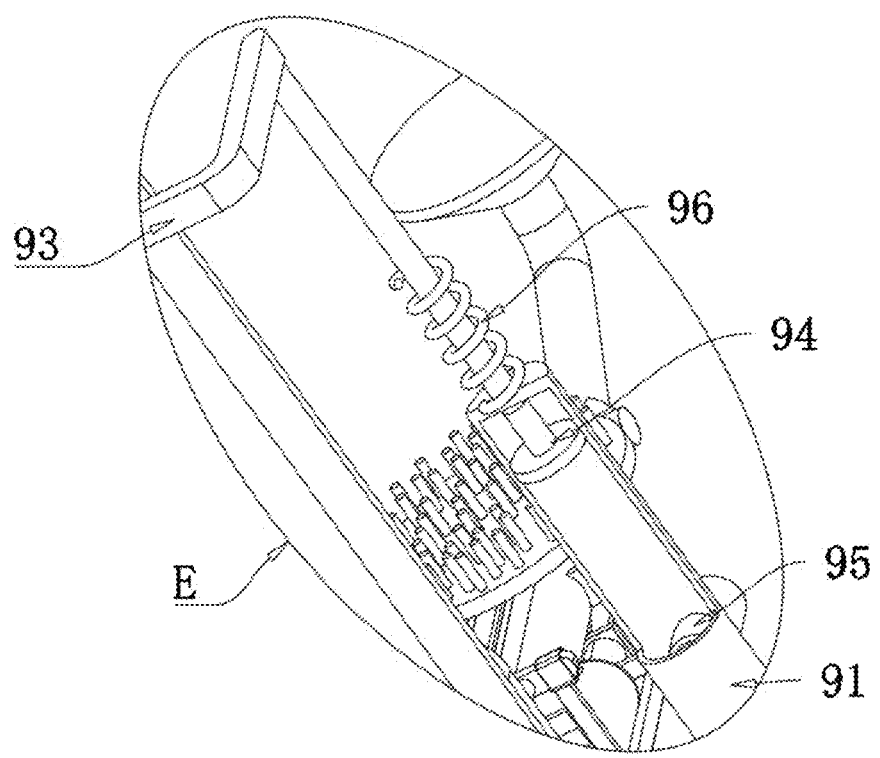
FIG. 9 is an enlargement view of portion E in FIG. 8 according to the present disclosure.

Referring to FIGS. 3 and 7, an upper end of the limit spring 82 is fixedly connected to the outer wall of the support column 3, and a lower end of the limit spring 82 is fixedly connected to the hollow conical sleeve 81. The magnetic sliding sleeve rod 813 is sleeved on an exterior of the long rod 811, the magnetic sliding sleeve rod 813 has a magnetic pole opposite to that of the magnetic block I 814, and the magnetic sliding sleeve rod 813 has the same magnetic pole as the magnetic block II 815. Each of the portable and detachable chip removal components further includes a spring-loaded telescopic short rod 816, and the spring-loaded telescopic short rod 816 is fixedly connected to an upper portion of the flat plate 4. The spring-loaded telescopic short rod 816 can be extended up and down, and an upper end of the spring-loaded telescopic short rod 816 is fixedly connected to the long rod 811. Four groups of the limit insertion block 83, the guide column 84, the auxiliary spring 85 and the insertion groove 86 are arranged, with the limit insertion block 83 being inserted in the insertion groove 86. One face, close to the hollow conical sleeve 81, of the guide column 84 is arranged with a round corner and fits to an inner surface of the hollow conical sleeve 81.

Figure 4:
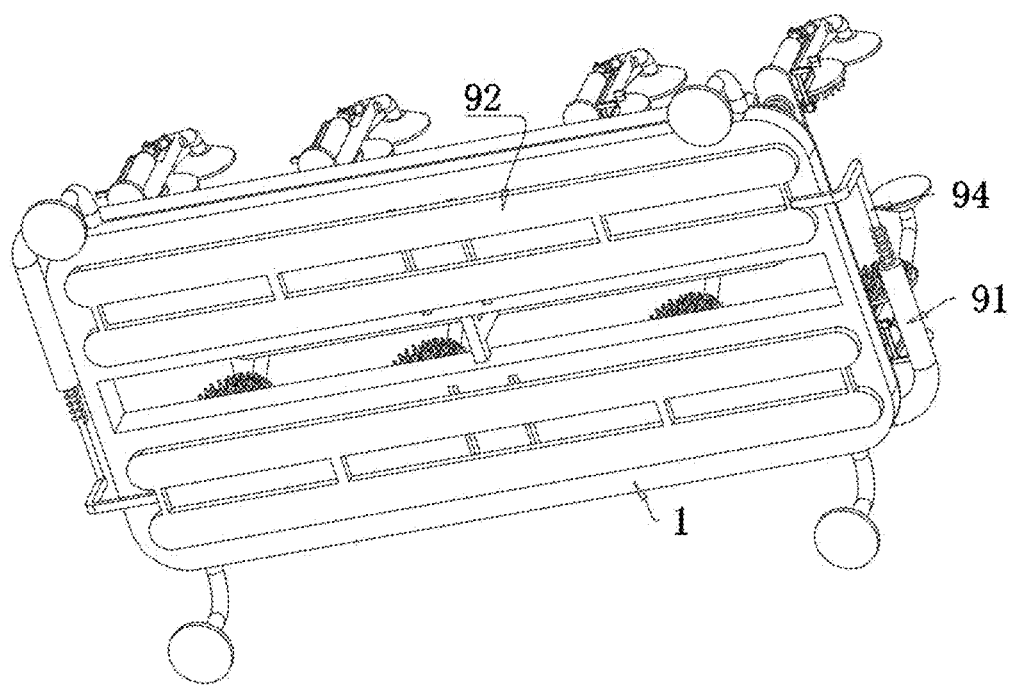
FIG. 4 is a schematic structural diagram of mounting a base plate and a bottom plate according to the present disclosure.

Referring to FIGS. 1, 4 and 5, the two groups of tabletop cleaning components are arranged opposite in position and direction. Each group of tabletop cleaning component includes air outlet pipes 91, bottom plates 92, and extension rods 93. The base plate 1 is symmetrically and fixedly connected to the air outlet pipes 91, and the air outlet pipes 91 are internally arranged with one-way air outlet valves. A lower portion of the base plate 1 is slidably connected to the bottom plates 92, and faces of the bottom plates 92 away from each other are fixedly connected to the extension rods 93. The insertion hole 2 is a round hole disposed in a penetrating manner. The bottom plates 92 are fixedly fitted to the lower portion of the base plate 1, for supporting the inserted support column 3.

Referring to FIGS. 1, 4, 5, and 7-9, the tabletop cleaning component further includes a piston pumping column 94, and an inner cavity of one end, close to the extension rod 93, of the air outlet pipe 91 is slidably connected to the piston pumping column 94 in a penetrating manner. The tabletop cleaning component further includes a one-way air inlet valve 95, and a reset spring 96. The one-way air inlet valve 95 is arranged at exteriors of the two air outlet pipes 91, the reset spring 96 is sleeved on an outer wall of the piston pumping rod 94, and one end of the extension rod 93 is fixedly connected to the piston pumping rod 94. One end of the reset spring 96 is fixedly connected to an outer wall of the air outlet pipe 91, and the other end of the reset spring 96 is fixedly connected to an outer wall of the piston pumping column 94. The air outlet pipe 91 is internally arranged with a one-way air outlet valve, and a plurality of air outlet holes are disposed on the air outlet pipe 91, and air is discharged from the air outlet pipe 91 through the air outlet holes. A groove for collecting welding slag is disposed in the middle of the base plate 1.

The full working process and working principle of the above example are as follows.

Initial state: referring to FIGS. 1, 2, and 3 for details, the telescopic air cylinder 5 is in a normal state without upward force. Since the magnetic sliding sleeve rod 813 and the magnetic block I 814 have opposite magnetic poles, they attract each other, causing the magnetic sliding sleeve rod 813 to be slidably sleeved on the exterior of the long rod 811.

During operation, a robotic arm in the welding production line places a vehicle body to be welded on the upper portion of the placement plate 10, and the telescopic air cylinder 5 is activated to push the telescopic pulling rod 6 upward, which rotates around the hinge point at the upper portion of the support column 3 (seen in FIG. 2). As the telescopic pulling rod 6 continues to rotate, the clamping plate 7 at one end is driven to rotate downward and abuts against the upper portion of the vehicle body, achieving the clamping purpose. Upon the welding is completed, the telescopic air cylinder 5 retracts, resetting the telescopic pulling rod 6 and the clamping plate 7, so the clamping plate 7 no longer abuts against the welded vehicle body. The telescopic air cylinder 5 is then controlled to move upward to its highest point, pushing the telescopic pulling rod 6 to rotate upward the clamping plate 7 until the clamping plate 7 approaches and fits against the surface of the sweeping brush plate 89. As the telescopic air cylinder 5 moves upward, the external L-shaped rod 812 and the magnetic sliding sleeve rod 813 are driven to move upward simultaneously. Since the magnetic block I 814 is attracted to the magnetic sliding sleeve rod 813 at this point, the magnetic sliding sleeve rod 813 is sleeved on the outer surface of the long rod 811, which will then pull the long rod 811 upward. Because the long rod 811 is fixedly connected to an exterior of the belt 810, it pulls the belt 810 upward. As the long rod 811 moves upward, it stretches the spring-loaded telescopic short rod 816, causing the belt 810, the first rotating shaft 87, and the second rotating shaft 88 to rotate. The rotation of the first rotating shaft 87 drives the sweeping brush plate 89 to rotate. When the long rod 811 is continuously pulled close to the magnetic block II 815, the magnetic sliding sleeve rod 813 slides away from the magnetic block II 815 along the groove of the L-shaped rod 812 due to the same magnetic poles repelling each other. As a result, the magnetic sliding sleeve rod 813 detaches from the long rod 811. Consequently, as the telescopic air cylinder 5 continues to rise, it no longer drives the long rod 811 and the belt 810. At this point, the spring-loaded telescopic short rod 816 resets and rebounds to pull the long rod 811 downward, causing the long rod 811 to move the belt 810 again, which rotates the first rotating shaft 87 and the second rotating shaft 88 again, allowing the sweeping brush plate 89 to rotate and clean the surface of the clamping plate 7 after clamping. This effectively removes welding slag adhered to the surface of the clamping plate 7, preventing the particles of the welding slag from being pressed onto the surface of the vehicle body during the next clamping, which can lead to minor scratches or dents on the surface of the vehicle body. This ensures that the welding process is not affected by the welding slag, reducing defective vehicle bodies and improving the quality of the vehicle body welding.

Furthermore, when adjusting the clamping for different vehicle bodies, it is only necessary to pull down the hollow conical sleeve 81, allowing it to slide downward and stretch the limit spring 82. This causes the wall of the inner cavity of the hollow conical sleeve 81 to continuously compress the guide column 84. Since the hollow conical sleeve 81 has a narrow top and a wide bottom, when moving downward, it pushes the guide column 84 close to the outer wall of the support column 3, compressing the auxiliary spring 85. As the guide column 84 moves, it pulls the limit insertion block 83 at its lower end to slide into the groove embedded in the outer wall of the support column 3, allowing the limit insertion block 83 to disengage from the insertion groove 86 inside the original insertion hole 2. At this point, the support column 3 can be pulled upward to detach from the original insertion hole 2. Given that the vehicle body frames are irregular and vary in shape among different models, the support column 3 can be inserted into the corresponding insertion hole 2 based on the required clamping position for the vehicle body. The operation of pulling down the hollow conical sleeve 81 is repeated, allowing the limit insertion block 83 to retract into the support column 3, and the support column 3 is inserted into the corresponding insertion hole 2. When inserting, the bottom of the support column 3 abuts against the upper portion of the base plate 92, allowing the hollow conical sleeve 81 to be loosened. At this point, under the reset and rebound of the limit spring 82, the hollow conical sleeve 81 slides upward, no longer compressing the guide column 84. Meanwhile, under the reset and rebound of the auxiliary spring 85, the guide column 84 and the limit insertion block 83 are pushed away from the support column 3 again, inserting the limit insertion block 83 into the corresponding insertion groove 86 in the round hole. This effectively adjusts the installation of the support column 3 and the clamping plate 7, making it suitable for clamping different vehicle models, allowing users to quickly adjust the clamping tool when switching models, eliminating the cumbersome steps of adjusting with bolts and nuts conventionally required. This not only reduces labor intensity but also saves waiting time for welding different vehicle models.

Furthermore, when it is necessary to clean the base plate 1 of the work table, it only needs to manually pull the extension rods 93 at two ends of the base plate 1 in the direction away from the air outlet pipe 91. Since the extension rods 93 are fixedly connected to the corresponding bottom plates 92, the two bottom plates 92 are driven to slide away from each other below the base plate 1. When the extension rods 93 are pulled, they slide the piston pumping column 94 at one end, stretching the reset spring 96 outside the piston pumping column 94. This allows the piston pumping column 94 to slide within the air outlet pipe 91, creating a suction effect. During this suction, the one-way air intake valve 95 is opened, allowing air to enter the air outlet pipe 91. Afterward, the extension rods 93 can be loosened. At this point, the reset spring 96 resets and rebounds to pull the piston pumping column 94 close to the air outlet pipe 91. The one-way air intake valve 95 is closed at this time, while the one-way air outlet valve inside the air outlet pipe 91 is opened, expelling the air that is just pumped in through the holes in the air outlet pipe 91. Since the two air outlet pipes 91 are arranged in opposite directions, they simultaneously blow air towards the center of the base plate 1, facilitating the removal of residual welding slag from the surface of the base plate 1 and directing it into the groove of at the center of the base plate 1. Additionally, as the bottom plate 92 moves away in opposite directions, their upper portions no longer block the lower portion of the insertion hole 2, allowing for the easy removal of welding slag from the insertion hole 2. This helps maintain the cleanliness of both the base plate 1 and the work environment. It also contributes to lowering the temperature of the welding table, reducing the impact of residual welding slag on the components of the vehicle body.

Although the examples of the present disclosure have been shown and described, for those ordinary skilled in the art, it can be understood as various changes, modifications, replacements and variations can be made on these examples within the principle and spirit of the present disclosure. The scope of the present disclosure is defined by the attached claims and the equivalent thereof.

The invention claimed is:

1. An anti-skid and wear-resistant automatic positioning tool for welding production line based on digital twinning, comprising:
    a base plate (1), wherein a plurality of insertion holes (2) are uniformly disposed on the base plate (1);
    a plurality of support columns (3), wherein the plurality of insertion holes (2) serve to be inserted with the plurality of support columns (3);
    a plurality of flat plates (4), wherein outer walls of the plurality of support columns (3) are fixedly connected to the plurality of flat plates (4);

a plurality of telescopic air cylinders (5), wherein the plurality of flat plates (4) are fixedly connected to the plurality of telescopic air cylinders (5);

a plurality of telescopic pulling columns (6), wherein the telescopic pulling columns (6) are hinged to upper ends of the plurality of support columns (3), and upper ends of the plurality of telescopic air cylinders (5) are rotatably connected to the plurality of telescopic pulling columns (6);

a plurality of clamping plates (7), wherein away from the telescopic air cylinders (5) of the plurality of telescopic pulling columns (6) are fixedly connected to the plurality of clamping plates (7);

a placement plate (10), wherein the placement plate (10) is mounted on the base plate (1);

a plurality of portable and detachable chip removal components, wherein the plurality of portable and detachable chip removal components is mounted on the base plate (1); and a tabletop cleaning component, wherein the tabletop cleaning component is mounted on the base plate (1);

wherein each of the plurality of portable and detachable chip removal components comprises:

a hollow conical sleeve (81), wherein a first portion, below a flat plate (4) of the plurality of flat plates (4), of a support column (3) of the plurality of support columns (3) is slidably sleeved with the hollow conical sleeve (81);

a limit spring (82), wherein an outer wall of the support column (3) is sleeved with the limit spring (82);

a plurality of limit insertion blocks (83), wherein a plurality of grooves (31) are disposed on a circumferential surface of a second portion, inserted into a insertion hole (2) of the plurality of insertion holes (2), of the support column (3), the plurality of limit insertion blocks (83) are slidably connected inside the plurality of grooves (31) of the support column (3);

a plurality of guide columns (84), wherein upper portions of the plurality of limit insertion blocks (83) are fixedly connected to the plurality of guide columns (84);

a plurality of auxiliary springs (85), wherein the plurality of auxiliary springs (85) are uniformly and fixedly connected to the outer wall of the support column (3), and one ends of the plurality of auxiliary springs (85) are fixedly connected to outer walls of the plurality of guide columns (84);

a first rotating shaft (87), wherein the outer wall of the support column (3) is rotatably connected to the first rotating shaft (87);

a second rotating shaft (88), wherein the outer wall of the support column (3) is rotatably connected to the second rotating shaft (88);

a sweeping brush plate (89), wherein one end of the first rotating shaft (87) is fixedly connected to the sweeping brush plate (89);

a belt (810), wherein an outer wall of the first rotating shaft (87) is connected to that of the second rotating shaft (88) via the belt (810) in a transmission manner, a long rod (811), wherein one face of the belt (810) is fixedly connected to the long rod (811);

an L-shaped rod (812), wherein one end, close to a telescopic pulling column (6) of plurality of telescopic pulling columns (6), of the telescopic air cylinder (5) is fixedly connected to the L-shaped rod (812);

a magnetic sliding sleeve rod (813), wherein one face, close to the long rod (811), of the L-shaped rod (812) is slidably connected to the magnetic sliding sleeve rod (813), and a magnetic block I (814) and a magnetic block II (815), wherein a part, close to the magnetic sliding sleeve rod (813), of the an outer wall of the support column (3) is fixedly connected to the magnetic block I (814) and the magnetic block II (815), and wherein a plurality of insertion grooves (86) are disposed at positions corresponding to the plurality of grooves of an inner wall of the insertion hole (2).

2. The anti-skid and wear-resistant automatic positioning tool for welding production line based on digital twinning as claimed in claim 1, wherein an upper end of the limit spring (82) is fixedly connected to the outer wall of the support column (3), and a lower end of the limit spring (82) is fixedly connected to the hollow conical sleeve (81).

3. The anti-skid and wear-resistant automatic positioning tool for welding production line based on digital twinning as claimed in claim 1, wherein the magnetic sliding sleeve rod (813) is sleeved on an exterior of the long rod (811), the magnetic sliding sleeve rod (813) has a magnetic pole opposite to that of the magnetic block I (814), and the magnetic sliding sleeve rod (813) has the same magnetic pole as the magnetic block II (815).

4. The anti-skid and wear-resistant automatic positioning tool for welding production line based on digital twinning as claimed in claim 3, wherein the each of the plurality of portable and detachable chip removal components further comprises:

a spring-loaded telescopic short rod (816), the spring-loaded telescopic short rod (816) being fixedly connected to an upper portion of the flat plate (4), and an upper end of the spring-loaded telescopic short rod (816) being fixedly connected to the long rod (811).

5. The anti-skid and wear-resistant automatic positioning tool for welding production line based on digital twinning as claimed in claim 1, wherein four groups of the limit insertion block (83), the guide column (84), the auxiliary spring (85) and the insertion groove (86) are arranged, with the limit insertion block (83) being inserted in the insertion groove (86).

6. The anti-skid and wear-resistant automatic positioning tool for welding production line based on digital twinning as claimed in claim 1, wherein two groups of tabletop cleaning components are arranged, each group of the two groups of tabletop cleaning components comprises:

an air outlet pipe (91), wherein the base plate (1) is symmetrically and fixedly connected to air outlet pipes (91) of the two groups of tabletop cleaning components;

an one-way air outlet valve, wherein the air outlet pipe (91) is internally arranged with the one-way air outlet valve;

a bottom plate (92), a lower portion of the base plate (1) is slidably connected to the bottom plate (92), and an extension rod (93), an end portion of the bottom plate (92) is fixedly connected to the extension rod (93).

7. The anti-skid and wear-resistant automatic positioning tool for welding production line based on digital twinning as claimed in claim 6, wherein each group of the two groups of tabletop cleaning components further comprises:

a piston pumping column (94), wherein an inner cavity of one end, close to the extension rod (93), of the air outlet pipe (91) is slidably connected to the piston pumping column (94) in a penetrating manner.

8. The anti-skid and wear-resistant automatic positioning tool for welding production line based on digital twinning as claimed in claim 7, wherein each group of the two groups of tabletop cleaning components further comprises:

- a one-way air inlet valve (95), wherein the one-way air inlet valve (95) is arranged at an exterior of the air outlet pipe (91), and
- a reset spring (96), wherein the reset spring (96) is sleeved on an outer wall of the piston pumping rod (94), and one end of the extension rod (93) is fixedly connected to the piston pumping rod (94).

9. The anti-skid and wear-resistant automatic positioning tool for welding production line based on digital twinning as claimed in claim 8, wherein one end of the reset spring (96) is fixedly connected to an outer wall of the air outlet pipe (91), and the other end of the reset spring (96) is fixedly connected to an outer wall of the piston pumping column (94).

\* \* \* \* \*